May 26, 1959

L. F. CARTER 2,887,784

MINIATURE GYRO COMPASS

Filed Dec. 30, 1955

INVENTOR
LESLIE F. CARTER
BY
Herbert H. Thompson
ATTORNEY

May 26, 1959 L. F. CARTER 2,887,784
MINIATURE GYRO COMPASS
Filed Dec. 30, 1955 4 Sheets-Sheet 2

INVENTOR
LESLIE F. CARTER
BY
Herbert H. Thompson
ATTORNEY

May 26, 1959   L. F. CARTER   2,887,784
MINIATURE GYRO COMPASS
Filed Dec. 30, 1955   4 Sheets-Sheet 3
Fig.5.
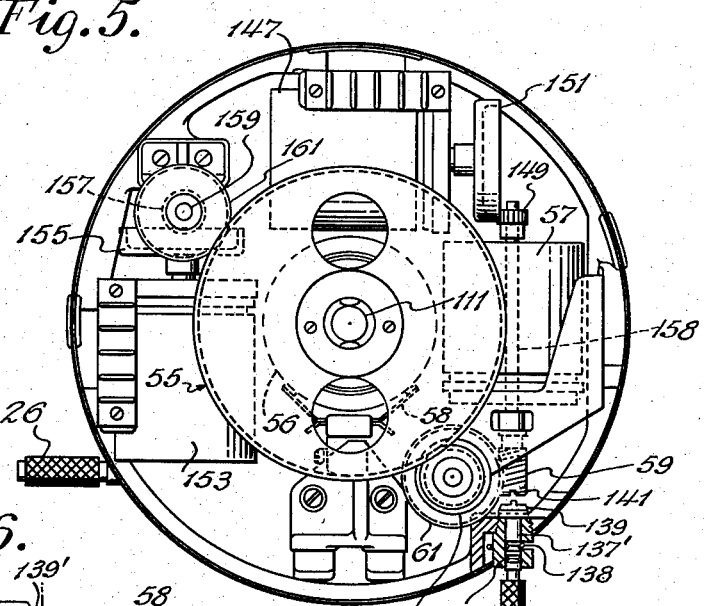
Fig.6.
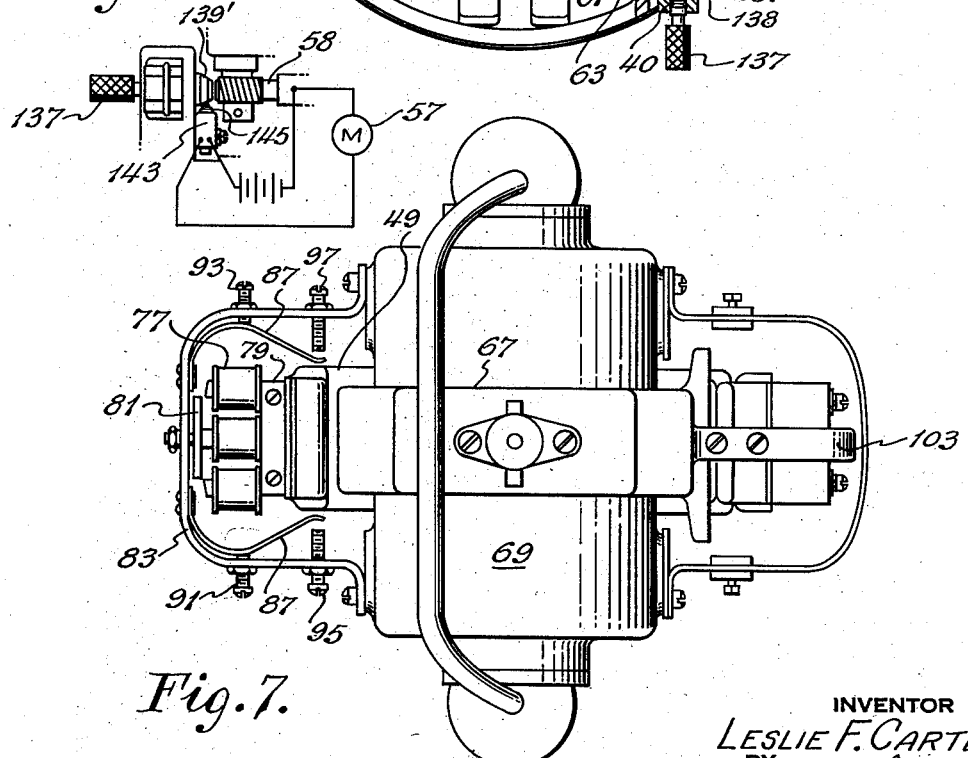
Fig.7.
INVENTOR
LESLIE F. CARTER
BY
Herbert H. Thompson
ATTORNEY May 26, 1959

L. F. CARTER 2,887,784

MINIATURE GYRO COMPASS

Filed Dec. 30, 1955

INVENTOR
LESLIE F. CARTER
BY
Herbert H. Thompson
ATTORNEY

United States Patent Office 2,887,784
Patented May 26, 1959

2,887,784
MINIATURE GYRO COMPASS

Leslie F. Carter, Leonia, N.J., assignor to Sperry Rand Corporation, Great Neck, N.Y., a corporation of Delaware Application December 30, 1955, Serial No. 556,628

9 Claims. (Cl. 33—226)

This invention relates to gyroscopic compasses, and more particularly, to miniature, inexpensive gyro compasses which are adapted for direct reading so that they may be placed in the pilot house of a ship adjacent the steering stand and used with or without repeater compasses actuated therefrom. By my new improvements outlined herein, together with certain of my recent prior inventions, the over-all size and weight of the gyro compass has been reduced to about one-tenth of the older conventional gyro compass without sacrificing the accuracy thereof. By my invention I also improve the performance of gyroscopic compasses by sealing the directive and related elements of the compass in a closed casing, which not only keeps out dust and prevents tampering with the noted parts by unskilled hands, but also serves as a magnetic shield against the earth's field or any stray disturbing fields on the ship. At the same time, by my invention I provide a direct reading card above the shield providing casing which is preferably not only readable from the top of the compass but also by one standing in front of the compass facing the prow of the ship.

My improved compass is also mounted in a two part binnacle which may be secured in either of two positions on the ship by means of a mounting plate which may be used either as a base pedestal or as a wall bracket. One of the parts of the binnacle is open both at the front and top portions thereof to provide a hinged transparent cover that seals the opening. In this manner the protectively enclosed compass card is visible at all times. The cover part of the binnacle may be opened to facilitate access to the caging and setting means of the compass that include components that extend through the aforesaid magnetic shield or casing. The compass is preferably made spray and dust-tight by a water-tight seal between the cover and the base parts of the binnacle with detachable clamps holding the cover to the base part.

In accordance with my invention, the frame carrying the directive element of the compass is directly mounted in the binnacle by means of a universal interconnection between the frame and binnacle in the form of a gimbal ring. Improved means are provided for damping the motions of the ring with respect to the relatively fixed components of the compass that the ring connects. A novel shock mounting is also utilized with the improved ring suspension for the frame of the gyro compass.

Referring to the drawings in which I have shown a preferred form of my invention, Fig. 1 is a side elevation partly in section of my improved miniature gyro compass;

Fig. 5 is a top view of the frame of the gyro compass with the compass card and top of the shield removed;

Fig. 6 is a sectional detail of the setting knob of the compass;

Fig. 7 is a bottom plan view of the directive element of the compass with parts broken away;

Figures 1, 2:
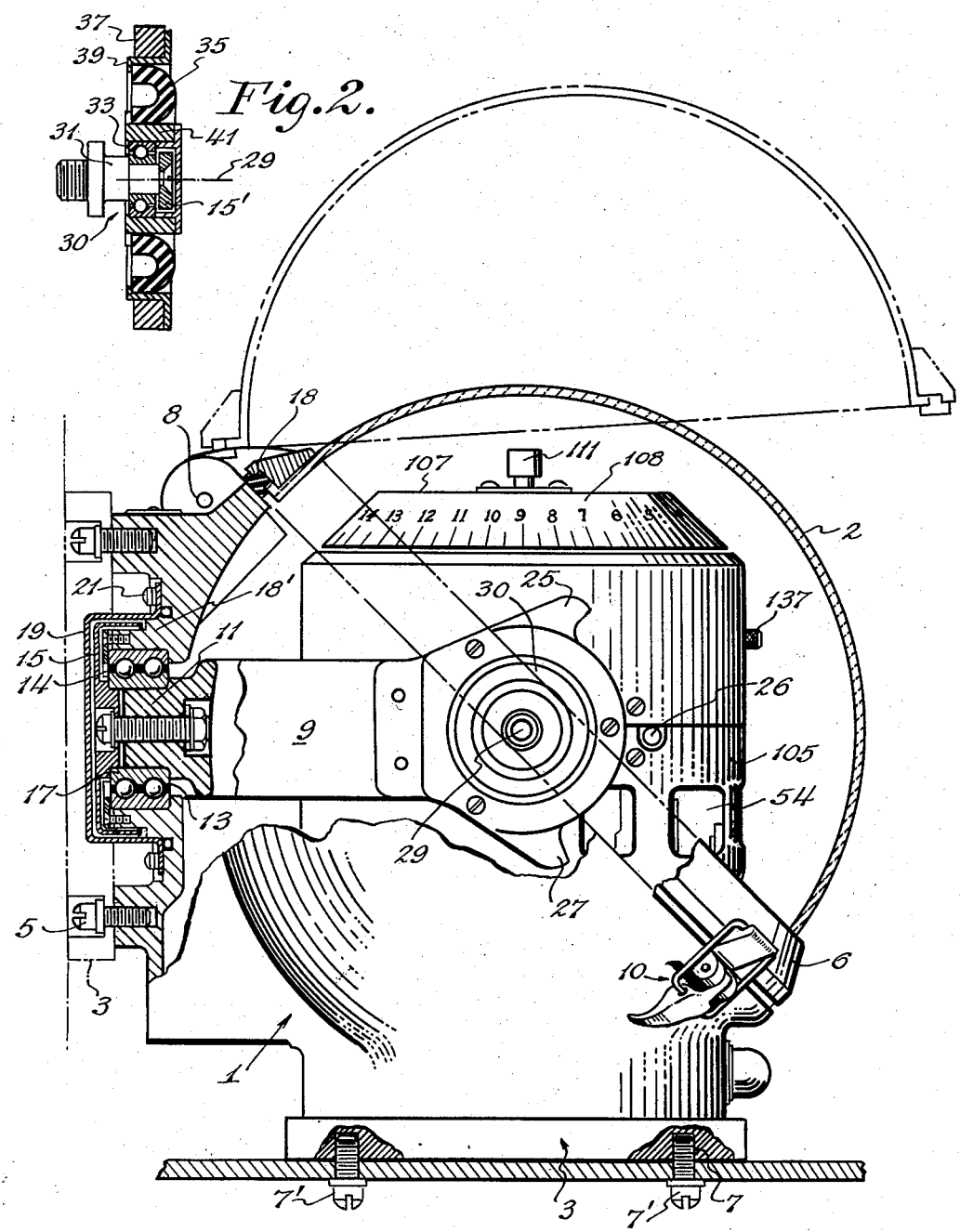
Fig. 2 is an enlarged sectional elevation of one of the bearings pivoting the frame of the directive element of the compass within its supporting gimbal.
Figure 4:
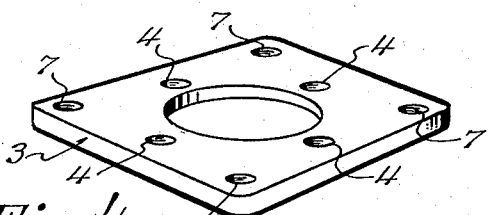
Fig. 4 is a perspective view on a smaller scale of a detachable mounting plate, which may be used to attach the binnacle either to the floor or wall of the pilot house.
Figure 3:
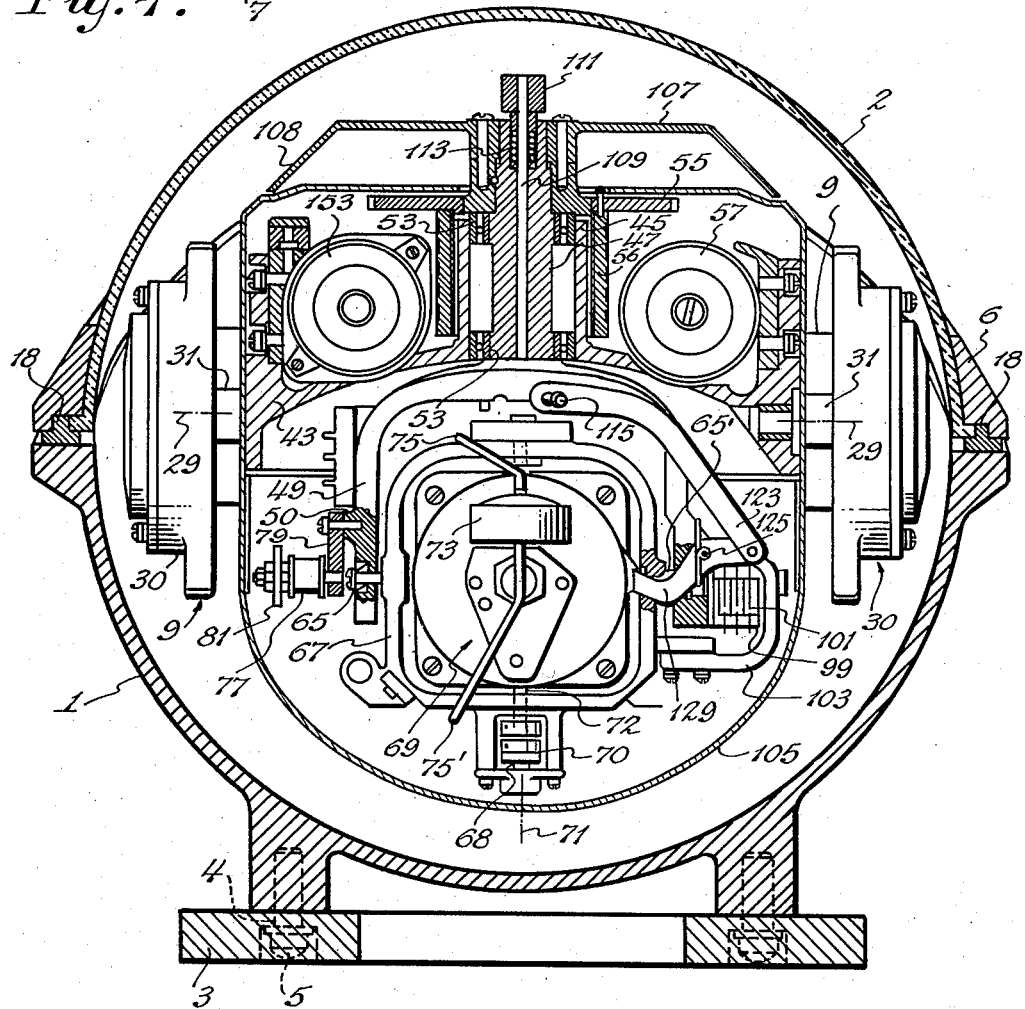
Fig. 3 is a south elevation of the compass looking north with the binnacle, shield and certain other parts in section.

As shown in Figs. 1 and 3, the directive and related elements of the compass are supported on the base part 1 of a binnacle provided with a detachable mounting plate 3 which may be secured either to the bottom of the base binnacle part by screws 5 extending through holes 4 therein or to the back of the part as indicated in the dotted lines in Fig. 1. Fig. 4 shows a perspective view of this plate showing also the threaded corner holes 7 for securing the mounting plate to the deck or to the wall of the pilot house as by screws 7'. In this manner the user has the choice of mounting the compass either on the horizontal deck or on the wall or other vertical stand on the ship.

The base binnacle part 1 is generally hemispherical in shape with bottom, rear and side portions, as shown, tilted rearwardly from the front to the back of the compass. A transparent cover binnacle part 2 with front, top and side portions in the form of a hemispherical transparent dome includes a metallic ring 6. Ring 6 is shown as hinged at the top 8 to the binnacle part 1 so that the cover part 2 may be lifted, as shown in dotted lines in Fig. 1, to facilitate ready access to the interior compass parts and the setting and caging knobs. In the closed position, the cover binnacle part is clamped against the base binnacle part by detachable clamps 10 with a rubber sealing ring 18 therebetween to make the binnacle spray- and dust-proof. The respective parts of the binnacle fit together to provide a protective enclosure for the interior compass parts such as the frame, the gimbal ring, the directive element of the compass, the follow-up element, the motor for driving the follow-up element, the signal means for operating the motor and the compass card. The cover part 2 of the binnacle is movable with relation to the base binnacle part 1 to provide a means for enclosing the noted interior compass parts while affording access thereto at the front, top and sides of the binnacle.

The noted compass parts are universally supported on the base binnacle part 1 by gimbal ring 9, pivoted in the rear portion thereof by means of trunnion 11 and anti-friction bearings 13. Preferably damping means are provided by the bearing itself for damping swinging of the gimbal and compass parts with relation to the fixed binnacle about the horizontal axis of the ring. For this purpose a cup-shaped member 15 is secured to the trunnion 11 and to the inner race 17 of the anti-friction bearings, the outer periphery of the cup extending beyond the outer race of the bearing and within and around the bearing supporting boss 18' of the binnacle part 1. Said cup is enclosed in the cup-shaped enclosure 19 secured around the boss 18 as by screws 21. A viscous liquid, such as silicone, is placed within the cup 19 and preferably fills the lower portion of the bearing so that as the gimbal ring 9 turns or oscillates within the binnacle part 1 a damping torque will be exerted on the cup by the drag of the viscous liquid. Sealing rings 14 may be used on each side thereof to keep the silicone from escaping.

Gimbal ring 9 is preferably open at the front or substantially semi-circular so that the parts of the compass supported on the frame may be seen and inspected from the front without interference by the gimbal. Stop ears 25 and 27 are shown thereon to engage a stop pin 26 on the frame 43 upon excessive swinging of the compass about the transverse horizontal axis 29 provided by the transverse gimbal bearings 30, one of said bearings being shown in section in Fig. 2. As shown, trunnion elements 31 extending laterally from the frame 43 are journalled in anti-friction bearings 33 within annular bosses 37 in the two ends of the gimbal 9 thereby providing pivotal axis 29. Said bearings may be likewise provided with a damping cup 15' and liquid as are bearings 13 above described. In addition, a shock mounting may be provided between the gimbal and the trunnion bearings at axis 29 so that no shocks will reach the directive element of the compass in any plane. Said shock mounting is shown as consisting of a natural or synthetic rubber ring 35 moulded in a U-shape, as shown in section, in an annular recess within boss 37 between the bearing retaining ring 41 and outer ring 39 which is fitted within the gimbal 9 so that the only contact of the frame supporting the directive element with the gimbal ring is through the rubber ring 35. The shock mounting may be either between the frame 43 and ring 9, as shown, or between the ring 9 and the rear portion of the binnacle part 1 at the axis of the ring 9.

The directive element of the compass is shown as supported by said frame 43 which is pivoted within the gimbal ring 9 by said trunnions 31. Said frame 43 is provided with a hollow vertical boss 45 within which the vertical stem 47 of the follow-up element or ring 49 is rotatably supported on spaced anti-friction bearings 53. Secured to said element is a gear 55 which is rotated by the follow-up motor 57 through worm 59, worm wheel 61 and gear 63 on the shaft of the worm wheel which meshes with the aforesaid gear 55 to the bottom of which a tubular collector ring assembly 56 is attached that cooperates with brushes 58, as shown in Fig. 5. At its lower end the follow-up element is shown as forked to provide a follow-up ring providing horizontal bearings 65, 65' for pivotally supporting the vertical ring 67 or inner gimbal of the directive element. The gyro rotor or rotors (not shown) are enclosed within a rotor case or casing 69 which is pivotally mounted for rotation about a normally vertical axis 71 within the vertical ring 67. Preferably I employ twin gyroscopic rotors within the casing 69 separately journalled to the north and south sides of the vertical pivotal axis 71. Casing 69 is journalled in said vertical ring on hollow trunnions 72 extending therefrom. A torsion wire-type of suspension may be provided along axis 71 employing a wire clamped at its bottom by two-part clamp 70 secured to lower trunnion 72 on case 69 and to the bottom of the wire. Said wire is suspended at the top from the vertical ring 67. For a more detailed description of the twin rotor case of the directive element and its suspension, reference may be had to my prior Patent No. 2,682,115 for Gyro Compass, dated June 29, 1954. The outer bracket contains mercury cups (not shown) into which pins 68 on clamp 70 project for leading current across the vertical axis of the sensitive element.

Meridian seeking properties are imparted to the directive element by liquid containers 73 secured to the opposite ends of the rotor case and connected at the top and bottom by restricted pipes 75, 75'. Preferably said containers are located above the axis 65, 65' of the directive element for the reasons explained in my copending application Serial No. 538,621 for Gyro Compass, filed October 5, 1955, now Patent No. 2,821,791.

The follow-up motor 57 may be controlled by any form of pick-off acting between the directive element and the follow-up element. The pick-off shown is of the inductive E-type in which the three wound fingers 77 are supported on an extension 50 of follow-up ring 49 as by means of bracket 79 and the armature 81 is supported in a U-shaped bracket 83 (see Figs. 3 and 7) secured at each end to the rotor case and supporting at its center said armature 81. Said bracket also preferably carries a U-shaped leaf spring 87, the free ends of which are normally spaced a short distance from said bracket 79 on the follow-up ring 49, as shown in Fig. 7. The position of said free ends of said spring may be adjusted by set screws 91 and 93 so as to lie approximately mid-way between the side of bracket 79 and the adjacent adjustable screws 95 and 97 mounted in said U-shaped bracket for purposes hereinafter described.

On the side of the forked follow-up frame 49 opposite from the pick-off, I may mount the mercury cups 99 in which the fingers 101 connected to the vertical ring 67 dip. As shown said fingers are secured to the U-shaped bracket 103 secured to the vertical ring 67.

As shown, the directive element, the follow-up element, the follow-up drive motor and the noted pick-off are enclosed in a casing 105 or shield member which is shown as surrounding the frame 43 and the noted parts of the compass. This casing has the multiple purpose of sealing the directive element against dust and moisture, preventing tampering with the noted internal parts of the compass by unauthorized persons and also shielding the parts against the magnetic field of the earth or other stray fields such as caused by the ship's degaussing equipment to prevent any interaction between the spinning rotors and such fields which might disturb the directive element. The shield preferably covers substantially all parts of the compass with the exception of the gimbal 9 and the compass card 107 and is shown as extending over the top of frame 43 above the gear 55. It is, however, provided with windows 54 preferably covered by glass so that the internal parts may be seen if desired without removing the shield. Also the central vertical stem 47 of the follow-up system is shown as extending through a central aperture in the shield and as carrying the compass card 107. This card is preferably made with a downwardly sloping periphery or bezel 108 on which the compass graduations are placed so that they may be read either from the top or front through the transparent binnacle part 2.

Figure 9:
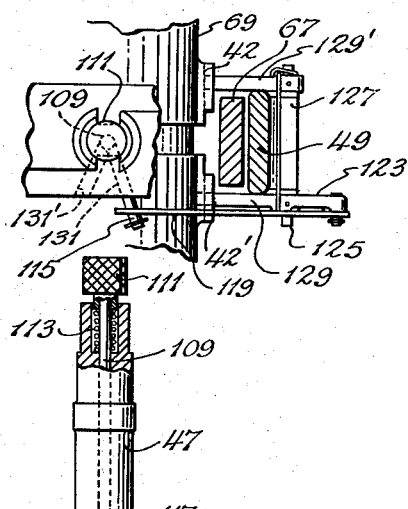
Fig. 9 is a top view of the caging means with parts broken away.
Figure 8:
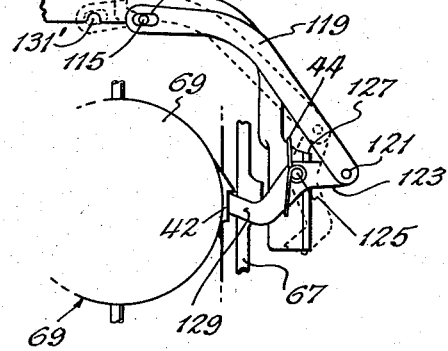
Fig. 8 is an elevation of the caging means shown in Fig. 3 with most other parts omitted for the sake of clarity.

A caging rod 109 and knob 111 are shown as being rotatably mounted in an axial bore extending through said stem 47. The rod and knob are normally pushed outwardly by means of the coil spring 113 in a recess in stem 47 near the top thereof. At its bottom the rod 109 is provided with a right-angled elbow or crank arm 115 (Figs. 8 and 9) which engages at its end an elongated hole 117 in the end of a link 119 pivoted at 121 to arm 123. Said arm is secured to cross shaft 125 journalled in bracket 127 secured to the follow-up frame 49. Secured to each end of said shaft 125 are locking fingers 129, 129', the ends of which engage in their locking position two lugs 42, 42' extending from the side of the rotor casing 69. These fingers also straddle the vertical ring 67 so that in the engaged position not only is the vertical ring and hence the directive element held against rotation in azimuth, but also the rotor casing is locked against tilting about its horizontal axis 65, 65'. In the caged position, said fingers are yieldingly held in the locking position by wire spring 44. To release the cage, the knob 111 is first pressed downwardly so that the elbow portion 115 thereon is disengaged from the slot 131 in which it is held by the spring 113 when the compass is caged. Said knob is then rotated clockwise in Fig. 9 until the elbow portion 115 engages a second slot 131' at an angle to slot 131, at which time the knob is again released to center the elbow in slot 131'. The parts then assume the position shown in the full lines in Fig. 8 from which it will be seen the link 119 has been rotated about its center 121 and also moved to the left thereby rotating the arm 123 and the locking fingers 129 about the pivot 125 from the full line to the dotted line position in Fig. 6, in which position the directive element is unlocked and uncaged (the normal running position).

Before uncaging, however, the operator should set the directive element approximately on the meridian. In order to accomplish these purposes, the operator manipulates the setting knob 137 by pushing it in until spring wire 138 engages a second groove 40 and then turning it (see Fig. 5). This knob projects through the front of the shield as shown in Fig. 5, and when pushed in brings a key 139 thereon into engagement with a slot 141 in the end of the worm 59 above described on the shaft 158 of the azimuth or follow-up motor 57. Rotation of the knob 137 while pushed in will bring the ring 49 into engagement with the end of spring arm 87 and push it into positive contact with the end of the adjacent set screw 95 or 97 on U bracket 83 on the rotor case 69. This mode of operation is used when resetting the directive element in azimuth before starting up to turn the directive element around with the follow-up element by main force through contact between ring 49 with set screws 95 or 97. Normally, of course, there is sufficient clearance between the screws 95 and 97 and the U-shaped spring 87 and between the U-shaped spring and follow-up ring 49 so that in normal operation no engagement between these parts takes place, since the follow-up motor accurately maintains the follow-up frame in line with the azimuthal position of the directive element.

After this initial setting, current then may be turned on to spin the rotors and excite the follow-up system and repeater systems. If it is then found that the directive element is not level, as shown by liquid levels on the element (not shown), the operator may quickly level the same by again pushing in the setting knob 137 and rotating the same. Since at this time the follow-up motor is energized and movement of the knob 137 by hand would be resisted by the motor, I provide a circuit breaking switch 143 adjacent the end of the shaft 137' of knob 137 (Fig. 6). This switch is shown as having a push button 145 which is engaged by a cam surface 139' on the push rod 137' so that as the knob is pushed in, the cam surface pushes switch button 145 in and opens the circuit to the azimuth motor, thereby deenergizing it and permitting the worm 59 to be rotated by the knob 137. This will rotate the vertical ring 49 and bring it into contact with the adjacent end of U-shaped spring 87, thereby exerting a moderate torque on the directive element of the gyroscope about its vertical axis. Since the rotor is running at this time and uncaged, this will cause the directive element to precess about its horizontal axis to level the same until the knob 137 is returned to its null position.

My compass may be sold with or without a transmission system to transmit the readings to repeater compasses, but I have shown the same as provided with both a coarse and a fine self-synchronous transmission system (Fig. 5). For this purpose I have shown the coarse synchro transmitter 147 as driven from the shaft 58 of the azimuth motor 57 by means of a pinion 149 on said shaft and a crown gear 151 on the shaft of the synchro, the gearing being so arranged so that the armature of the synchro makes one complete revolution for a complete revolution in azimuth of the gear 55. The fine synchro is shown at 153. It is also provided with a crown gear 155 driven from a pinion 157 on the shaft 159 which also carries a larger pinion 161 meshing with the follow-up gear 55. The synchro 153 is preferably driven at a 36:1 ratio with respect to the gear 55.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a setting device for levelling a gyro compass while running, having follow-up and directive elements and a motor for turning the former, an enclosing casing for the elements and motor, a normally disengaged setting means extending through said casing and adapted to detachably engage and turn said follow-up element, means brought into action by the engagement of said setting means with said follow-up element for deenergizing said motor, whereby subsequent turning of said setting means turns said follow-up element, and yielding stop means engaged upon limited relative turning in azimuth between said elements, whereby a torque is applied about the vertical axis of the directive element to level it by engaging and turning said setting means.

2. A setting device for a gyro compass as claimed in claim 1, also including caging means extending through said casing for locking the directive and follow-up elements together whereby said setting means may also be used to set the directive element near the meridian in starting up.

3. In a setting device for a gyro compass having a follow-up and a directive element and a motor for turning the former, an enclosing casing for the element, follow-up and motor, caging and setting knobs located externally of said casing, a cage within the casing operated by the caging knob adapted to lock the follow-up and directive element together, and means within the casing brought into action by engagement of said setting knob with the follow-up for deenergizing said motor whereby upon engagement of said setting knob, both the follow-up and directive element may be set near the meridian whether the compass has been started up or not.

4. In a gyro compass, a binnacle, a frame, a gimbal ring universally supporting the frame in the binnacle with freedom about two mutually perpendicular, normally horizontal, axes, a follow-up vertical ring carried by said compass frame, a drive motor for the follow-up ring carried by the frame, a compass card operatively connected to the follow-up ring carried by the frame, a directive element carried by the frame, signal means between the directive element and follow-up ring for controlling the operation of the drive motor, and a member fitted to the frame covering the directive element, the follow-up ring, the ring driving motor and the signal means to shield the same from external disturbing fields, the compass card being located exteriorly of the shield member and the operative connection to the card extending through an opening in the member.

5. In a gyro compass having a directive element with an azimuth axis and a horizontal tilt axis, an element for following the directive element about its azimuth axis, and a motor for driving the following element; normally ineffective means for setting the directive element about its azimuth axis, and means rendering said setting means effective operable to disable said drive motor and turn said following element to apply a torque about the azimuth axis of the directive element to level it about the tilt axis.

6. A gyro compass as claimed in claim 5, including normally ineffective caging means for interlocking the directive and following elements with the directive element in a level condition about its tilt axis, and means for rendering said caging means effective operable to disable the drive motor for the following element.

7. In a gyro compass having a directive element with an azimuth axis and a horizontal tilt axis, an element for following the directive element about its azimuth axis, and a motor for driving the following element; normally ineffective caging means for interlocking the directive and following elements with the directive element in a level condition about its tilt axis, and means for rendering said caging means effective operable to disable the drive motor for the following element.

8. In a gyro compass, a binnacle, a gimbal mounting in said binnacle, a frame universally supported by said gimbal mounting carrying the directive element of the compass, a follow-up ring carried by said frame having a compass card operatively connected thereto, a motor carried by the frame for driving said follow-up ring, and a member fitted to the frame covering the directive element, the follow-up ring and the ring driving motor to shield the same from external disturbing fields, the compass card being located exteriorly of the shield member and the operative connection to the card extending through an opening in the member.

9. In a gyro compass, a binnacle, a gimbal mounting in said binnacle, a frame universally supported by said gimbal mounting, a follow-up vertical ring carried by said frame, a drive motor carried by the frame operatively connected to the follow-up ring, a directive element carried by the frame, signal means between the directive element and follow-up ring for controlling the operation of said drive motor, and a member fitted to said frame covering the follow-up ring, the drive motor, the directive element and the signal means to shield the same from external disturbing fields.

References Cited in the file of this patent

UNITED STATES PATENTS

| | | |
|---|---|---|
| 1,330,501 | Tanner | Feb. 10, 1920 |
| 1,499,602 | Bibbins | July 1, 1924 |
| 1,694,192 | Sperry | Dec. 4, 1928 |
| 1,728,185 | Mills | Sept. 17, 1929 |
| 2,178,623 | Carter | Nov. 7, 1939 |
| 2,232,537 | Kollsman | Feb. 18, 1941 |
| 2,269,103 | Harding et al. | Jan. 6, 1942 |
| 2,690,014 | Draper et al. | Sept. 28, 1954 |
| 2,698,772 | Roberts | Jan. 4, 1955 |
| 2,707,882 | Kent | May 10, 1955 |

FOREIGN PATENTS

| | | |
|---|---|---|
| 398,155 | Great Britain | 1933 |